Jan. 2, 1940.　　　　G. C. PEARCE　　　　2,185,517

ELECTRIC MOTOR CONTROL

Original Filed Dec. 31, 1935　　2 Sheets-Sheet 1

INVENTOR.
George C Pearce
BY
Spencer Hardman and Fehr
ATTORNEYS

Jan. 2, 1940.  G. C. PEARCE  2,185,517
ELECTRIC MOTOR CONTROL
Original Filed Dec. 31, 1935  2 Sheets-Sheet 2

INVENTOR.
George C Pearce
BY
Spencer Hardman and Fehr
ATTORNEYS

Patented Jan. 2, 1940

2,185,517

UNITED STATES PATENT OFFICE 2,185,517

ELECTRIC MOTOR CONTROL

George C. Pearce, Dayton, Ohio, assignor to General Motors Corporation, Dayton, Ohio, a corporation of Delaware Application December 31, 1935, Serial No. 56,968
Renewed November 1, 1937

4 Claims. (Cl. 172—279)

This invention relates to refrigerating apparatus and more particularly to starting controls for the compressor motors of refrigerating apparatus.

Heretofore I have provided a starting control for a split phase induction motor in which the starting relay for controlling the energization of the starting winding was provided with a shunt and a bimetal timer for terminating the energization of the starting relay after a period of time, controlled by the timer. In the same device, I also provided a bimetal actuated thermal overload. This device was a much needed improvement over the prior art and was incorporated in many thousands of electric refrigerators. In addition, this control was much less expensive than was previously used.

It is an object of this invention to provide a simplified, durable, less expensive control of the general type mentioned above, which can be readily manufactured in large quantities and which can be very readily set and adjusted.

My first form of starting control device, referred to above, I have found is somewhat affected by changes in room or environment temperatures. This does not prevent the actual operation of the device, but merely affects its timing and under adverse temperature conditions prevents it from operating exactly at the desired times.

It is a further object of my invention to provide for my motor starting control an improved timing device which is not materially affected by changes in environment temperatures.

It is a further object of my invention to provide an improved control device for a split phase motor which is exceedingly quiet.

Further objects and advantages of the present invention will be apparent from the following description, reference being had to the accompanying drawings, wherein a preferred form of the present invention is clearly shown.

Figure 1:
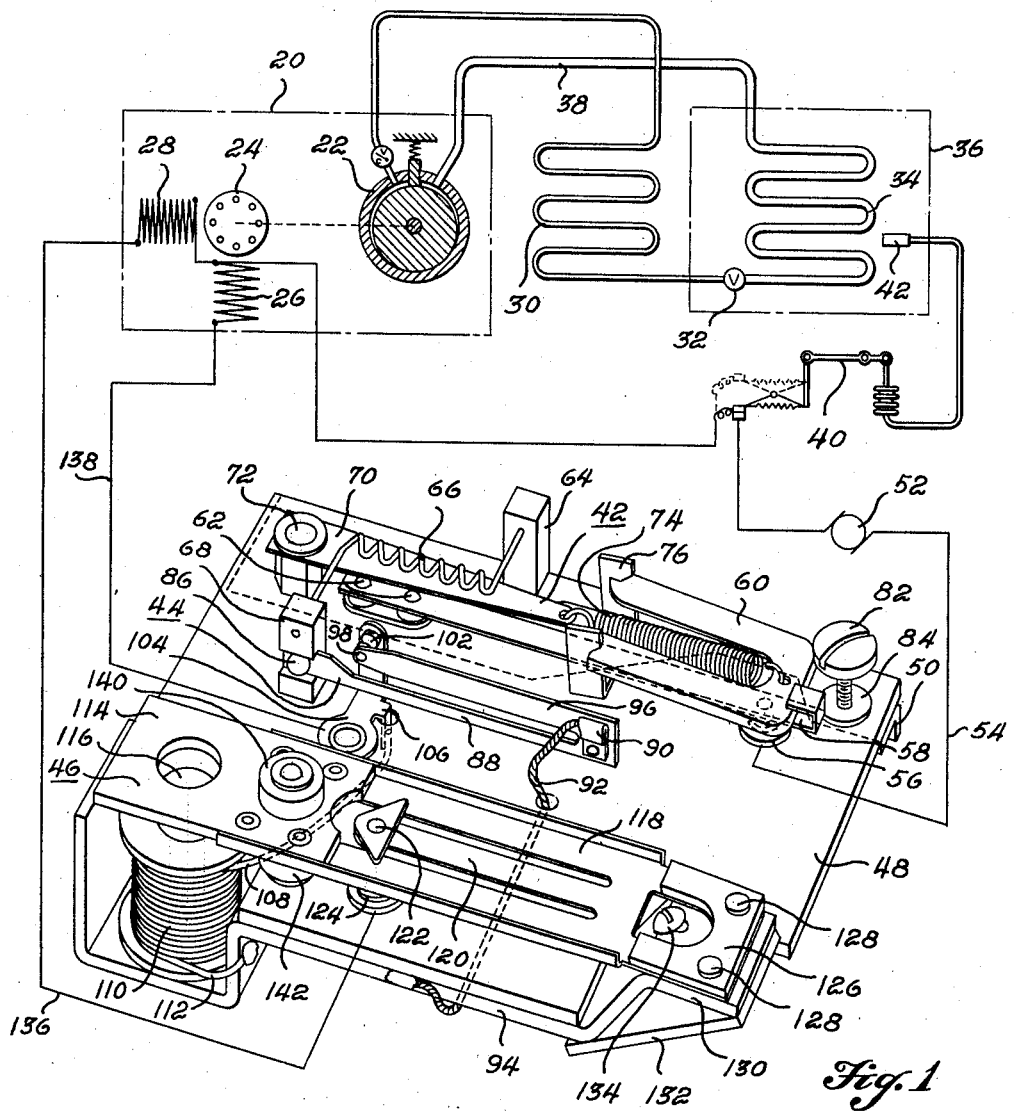
Fig. 1 is a diagrammatic view of a refrigerating system provided with a split phase induction motor controlled by my improved starting control device.

Briefly, I have disclosed a refrigerating system provided with a sealed motor-compressor unit of the split phase type having an exceptionally quiet, exceedingly simple, form of starting relay and a novel form of adjustment for controlling the energization of the starting winding together with a U-shaped bimetal timer provided in a shunt for the starting relay, which timer is provided with a compensating leg for compensating for changes in environment temperatures. I have also disclosed an improved and greatly simplified form of electro-thermal overload provided with a novel form of adjustment.

Referring now to the drawings, there is shown a sealed motor-compressor unit 20 provided with a rotary compressor 22 directly driven by a split phase induction motor 24 provided with a running winding 26 and a starting winding 28. The compressor compresses evaporated refrigerant and forwards the compressed refrigerant to a condenser 30 wherein the compressed refrigerant is liquefied and forwarded under the control of a suitable form of expansion valve 32 to an evaporating means 34 located within the enclosure 36 in heat exchange relation with the medium to be cooled. The liquid refrigerant evaporates within the evaporating means 34 under reduced pressure and is returned to the compressor through the return conduit 38. The energization of the electric motor 24 is controlled by a snap acting thermostat switch 40 controlled by a thermostatic bulb 42 located within the enclosure 36.

My improved starting control device includes a bimetal operated thermal overload switch generally designated by the reference character 42, a bimetal timer, generally designated by the reference character 44 and a starting relay, generally designated by the reference character 46, all of which is mounted upon a common base 48 of sheet insulation. The bimetal thermal overload 42 is connected in series with all circuits, as is the bimetal timer 44, while the starting relay coil and the contacts controlled by the bimetal timer are in parallel electric circuit relation with each other and in series with the running winding 26. The starting relay contacts, however, are in series with the starting winding 28.

Under normal circumstances, when the thermostatic switch 40 closes, the current flows through the thermal overload 42 through one leg of the bimetal timer 44, thence through the starting relay coil to the running winding 26. The flow of current through the starting relay coil attracts its armature, closing the starting relay contacts which permit the flow of energy through the starting winding, thus enabling the motor 24 to start. After sufficient current has flowed through the bimetal timer, the bimetal timer contacts are closed to shunt the starting relay, thus deenergizing the starting relay and permitting the starting relay contacts to open to deenergize the starting winding, thereafter the motor operates solely on the running winding until it stops. The contacts controlled by the bimetal timer may open after the starting period because of the insufficient heat effect of the current flowing through the running winding 26, but under such conditions, the current flowing through the starting relay coil will be insufficient to close the starting winding contacts. Should an excessive amount of electric energy flow through the thermal overload 42, the thermal overload contacts will open to prevent any current flowing through the apparatus.

Considering now the specific construction of the starting control device, the electric energy comes from the source of supply 52 through an electrical conductor 54 to a stud 56 fastened to the insulating material 48 and provided with a contact upon its upper face, which cooperates with a contact provided directly thereover and fastened to a thin narrow strip 58 of spring copper which is provided with an end portion bent up and over for making engagement with a flanged U-shaped toggle lever 60 of extremely thin metal. The opposite end of the copper strip 58 is fastened by a pair of studs 62 to the insulating base 48. These studs 62 extend through to a flanged copper plate of an irregular shape beneath the insulating member 48.

This copper plate is provided with a post 64 which extends upwardly through a notch in the insulating base 48. The upper end of this post holds one end of an electric heater coil 66 formed like a coil spring which carries all of the electric energy to a second post 68, mounted upon the insulating base 48 away from the copper plate 50. The heater 66 is located in close proximity to a tapered bimetal member 70, having its large end anchored to a stud 72, mounted upon the insulating base member 48 and riveted to the copper plate 50. The small end of this tapered bimetal 70 is provided with an aperture which receives one end of a tension toggle spring 74 having its other end hooked through an aperture in the central portion of the U-shaped toggle lever 60.

Figure 2:
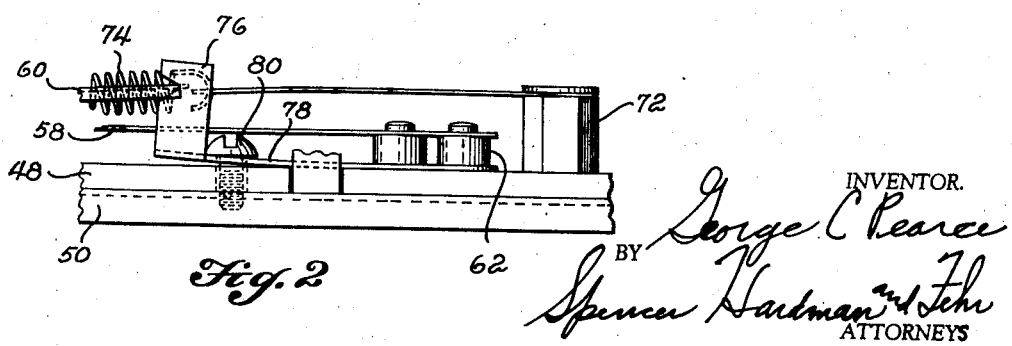
Fig. 2 is a fragmentary view of a portion of my improved starting control device looking toward the upper edge of the control device as it appears in Fig. 1.
Figure 3:
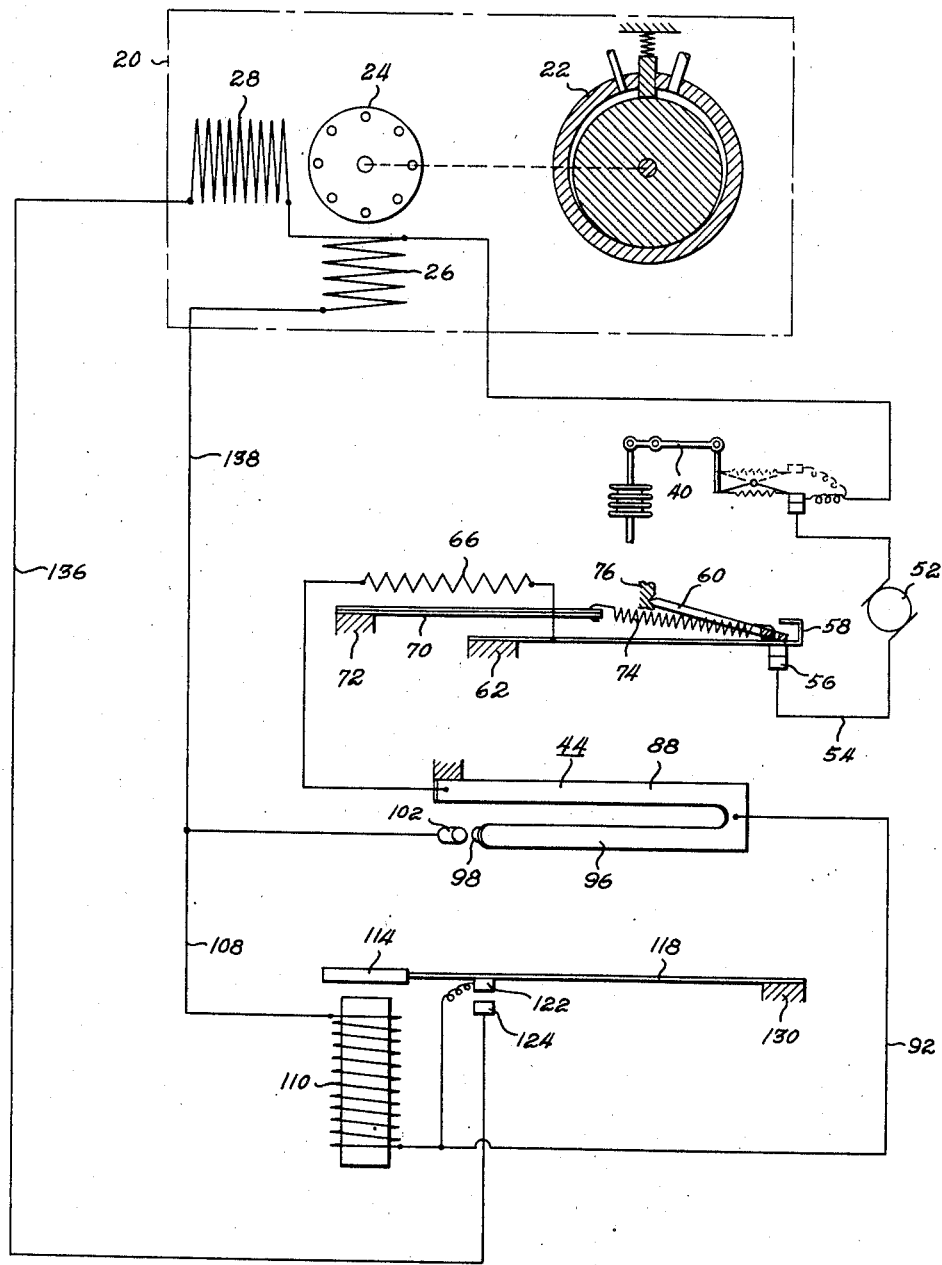
Fig. 3 is a diagrammatic view of the motor, the switches and the connecting control circuits all shown diagrammatically.

The legs of the toggle lever 60 are provided with notches which are received within V-shaped notches formed in a pair of up-turned arms 76 of a spring copper plate 78 which is hidden in Fig. 1 for the greater part, but which is clearly shown in Fig. 2. As shown in Fig. 2, this spring plate 78 has the end opposite to the up-turned projections 76 anchored beneath the studs 62 to which the thin narrow copper strip 58 is anchored. The free end of this spring plate 78, which is provided with the up-turned projections 76, tends to curl up, away from the insulating base 48. The amount of this curl is regulated by a set screw 80 which extends through the insulating base 48 into the copper plate 50. This screw locates the position of the pivot point of the U-shaped toggle lever 60 with respect to the tapered bimetal member 70 as well as the base 48.

Thus, by turning the screw 80 downwardly, the pivot points are lowered with respect to the bimetal 70 and the contact 56 so that both the open and closing points at which the bimetal operates the contact 56 and its cooperating contact on the strip 58 will be lowered. Likewise, the turning of the screw 80 upwardly will raise the temperatures of the bimetal 70, at which these contacts are opened and closed. This provides a simple, accurate, inexpensive adjustment which can be made very fine by providing a fine threaded set screw 80. It is the practice to adjust the screw 80 in order to obtain the particular tripping point or temperature desired, and to vary the closing point by means of a large flat-headed set screw 82 which is threaded into a stud 84 riveted to both the insulating base 48 and the copper plate 50. The enlarged head of this screw 82 engages the U-shaped toggle lever 60 in its upward movement to serve as a limiting stop. This determines the extreme angularity of the toggle lever 60 and through this controls the temperature at which the tapered bimetal 70 again closes the seat of thermal overload contacts.

The electric current from the supply conductor 54 thus passes through the contact 56 and its cooperating contact fixed to a thin narrow strip 50 which strip conducts the electric energy to the copper plate 50 from which the current passes through the stud or post 64 through the heater wire 66 to the post 68. When an excessive amount of electric energy passes through the curled heater wire 66, the bimetal 70 is heated sufficiently to curl upwardly and to trip the U-shaped toggle lever 60 upwardly against the head of the screw 82 to open the thermal overload contact. This stops the flow of electric energy to the heater 66, permitting the bimetal 70 to cool and curl downwardly, thus tripping the toggle lever 60 downwardly again with a snap action to close the overload contacts.

Riveted to the post 68 by a rivet 86, is the lower leg 88 of a generally U-shaped bimetal timer 55 which is formed from a single piece of bimetal having its lower leg about one-fourth the width of the upper leg and separated from the upper leg by a space or slot greater than the width of the lower leg. All of the motor current passes through this lower leg 88 to a sheet metal clip 90 riveted to the closed end of the bimetal 44. This sheet metal clip 90 is connected by an electrical conductor 92 through an aperture in the base 48 to the base 94 of the starting relay switch for the starting winding which is fastened to the bottom side of the insulating base 48.

The upper leg 96 of the bimetal timer 44 is provided with a contact 98 which, when the leg 88 is heated sufficiently by the current flowing through it, engages a cooperating contact 102 mounted upon an up-turned projection of a bracket 104 riveted to the base. This projection may be bent to provide an adjustment for the location of contact 102. This contact bracket 104 has a down-turned projection 106 extending through an aperture in the base, connected by an electrical conductor 108 to the starting relay coil 110 mounted upon a starting relay base 94. The other end 112 of the winding of the starting relay coil is connected to the starting relay base 94. The starting relay coil is located within the generally U-shaped end portion of the starting relay base 94 which is made of a magnetic material such as a suitable iron or soft steel to carry the magnetic flux. This U-shaped portion and the starting relay coil 110 cooperates with an armature 114 provided with an aperture for receiving the core 116 of magnetic material of the relay coil 110.

This armature 114 is riveted to the free end of a spring copper plate member 118 provided with flanges the greater portion of its length, excepting the portion nearest its anchor point. The mid portion of this spring copper plate 118 is provided with a spring leg 120 which carries a contact 122 and a triangular-shaped stopping piece of copper at its free end. The triangular-shaped piece of brass or copper limits the downward movement of the leg 120 with respect to the spring brass or copper member 118, while the contact 122 cooperates with a cooperating contact 124 provided on a stud fastened to the end extending through an enlarged aperture in the relay base 94 beneath the insulating base 48 so as to prevent electrical conduction thereto. This stud 124 is connected to the electrical conductor 136 which connects and supplies electric energy to the starting winding 28. Felt pads 140 and 142 are provided upon a pin fixed to the insulating base 48 and the relay frame 94 to serve as quiet stop members to limit the upward and downward movement of the armature 114. Over the anchor end of this spring copper plate, there extends a U-shaped anchor plate 126, of sheet brass which is riveted by rivets 128 to a bent-up portion 130 of the relay base 94. This provides an anchor at approximately the correct angle for the end of the spring member 118 which carries the armature 114. The bendable portion of the spring copper plate 118 is between the flanged portion and the anchor plate 126.

Beneath this bent-up portion 130, there is provided a plate 132 of the same material, which is held in place solely by a set screw 134 which extends through an aperture right at the upper end of the relay base 94 and is threaded to this small plate 132 in order to provide a minute adjustment of the angle of this end portion 130 so as to provide an adjustment for the actuation of the starting relay. This is done by virtue of the bending stress applied at this bend through which the screw 134 passes.

When the switch 40 or the thermal overload 42 closes, after being opened (both being required to complete the circuit), the current flows through the thermal overload mechanism, the heater 66 to post 68, the leg 88 of the bimetal timer 44 through the electrical conductor 92, the base 94 of the relay mechanism, through the conductor 112, the relay coil 110, the conductor 108 to the bracket 104 and thence through the conductor 138 to the running winding 26. The current flowing through the relay coil 110 attracts the armature 114 against the spring effect of the copper spring member 118 to close the contacts 122, 124, thereby causing current to flow also from the relay base 94 through the copper member 118, the contacts 122 and 124 and the electrical conductors 136 to the starting winding 28.

This, under normal circumstances, would cause the motor 24 to begin to rotate and the current flowing through the leg 88 of the bimetal timer 44 will gradually heat up this leg, causing it to bend and, at the proper time, to close the contacts 98, 102 to permit the current to flow through the upper leg 96 through the contacts 98, 102 directly to the conductor 138, which connects to the running winding without passing through the relay coil 110. This will release the armature 114, which by reason of the spring in the copper member 118, will spring upwardly against its stop 140 to open the contacts 122, 124 to deenergize the starting winding 28. Normally, the bimetal timer then cools off, opening the contacts 98 and 102 and again permitting the current to flow through the relay coil 110. However, since probably less than one-fourth of the starting current now flows through the relay coil 110, the magnetic force exerted by the relay coil 110 is insignificant and is insufficient to attract the armature 114. Thus, the motor operates solely upon the running winding 26 during the remainder of each operating period regardless of the opening of the contacts 98, 102.

The upper leg 96 of the bimetal timer 44 is sufficiently greater in cross sectional area, that little or no heating effect is exerted thereon. This leg, however, compensates for the effect of environment temperature upon the leg 88. Thus, if the bimetal timer 44 should bend because of changes in room temperature, the contacts 98 and 102 will not have their relation changed because this bending will take place between the post 68 and the contacts on one end and the clip 90 at the other end, and the position of the contact 98 would be substantially unaffected. In this way both the legs 88 and 96 are affected in the same degree by environment temperature but, by reason of this compensating construction, there is no change in the operation of the bimetal timer.

While the form of embodiment of the present invention as herein disclosed constitutes a preferred form, it is to be understood that other forms might be adopted, all coming within the scope of the claims which follow.

What is claimed is as follows:

1. In combination, an electric motor having a starting winding circuit and a running winding circuit, a circuit including a starting relay operated by electric energy flowing through said running winding for controlling the flow of electric energy through the starting winding, a shunt for said starting relay, an electro-thermal device responsive to the flow of electric energy through one of said circuits and to environment temperature for terminating the energization of the starting relay, and a compensating means for said electro-thermal device for compensating the effect of environment temperature thereon.

2. In combination, an electric motor having a starting winding circuit and a running winding circuit, a circuit including a starting relay operated by electric energy flowing through said running winding for controlling the flow of electric energy through the starting winding, a shunt for said starting relay, and an electro-thermal device in the form of a plural legged bimetal device having one leg heated by the flow of electric energy through one of said circuits for controlling the flow of energy through said shunt, said bimetal device having a second leg responsive to environment temperature, said second leg when heated tending to move to open the shunt circuit and said one leg being movable to close the shunt circuit when heated.

3. In combination, an electric motor having a starting winding circuit and a running winding circuit, a circuit including a starting relay operated by electric energy flowing through said running winding for controlling the flow of electric energy through the starting winding, a shunt for said starting relay and an electro-thermal device in the form of a plural legged bimetal device having one leg heated by the flow of electric energy through one of said circuits and subject to environment temperature, said bimetal device having a second leg subject to environment temperature having an opposite reaction to said one leg for compensating the effect of environment temperature upon said one leg, said bimetal device controlling the flow of electric energy through said shunt.

4. In combination, an electric motor having a starting winding circuit and a running winding circuit, a circuit including a starting relay operated by electric energy flowing through said running winding for controlling the flow of electric energy through the starting winding, a shunt for said starting relay and a bimetal device for controlling the flow of electric energy through said shunt, said bimetal device being heated by the flow of electric energy through one of said circuits, a second bimetal device for controlling the flow of electric energy through the running winding circuit, said second bimetal device being heated by the flow of electric energy through the running winding circuit, one of said bimetal devices incorporating a piece of bimetal having a plurality of legs extending in one direction, the end portion of one of the legs being fixed and the end portion of another leg being provided with a switch contact, the other ends of said plurality of legs being connected together, said one device being provided with means for heating one of said legs independently of the other by the flow of electric energy.

GEORGE C. PEARCE.